(12) United States Patent
Dowlatkhah et al.

(10) Patent No.: US 10,588,034 B1
(45) Date of Patent: Mar. 10, 2020

(54) ANTENNA FARM INTELLIGENT SOFTWARE DEFINED NETWORKING ENABLED DYNAMIC RESOURCE CONTROLLER IN ADVANCED NETWORKS

(71) Applicants: AT&T Mobility II LLC, Atlanta, GA (US); AT&T Intellectual Property I, L.P., Atlanta, GA (US)

(72) Inventors: Sangar Dowlatkhah, Plano, TX (US); Zhi Cui, Sugar Hill, GA (US); Paul Smith, Jr., Heath, TX (US)

(73) Assignees: AT&T Mobility II LLC, Atlanta, GA (US); AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/215,832

(22) Filed: Dec. 11, 2018

(51) Int. Cl.
| | | |
|---|---|---|
| *H04W 24/04* | (2009.01) | |
| *H04B 7/04* | (2017.01) | |
| *H04W 4/029* | (2018.01) | |
| *H04W 28/24* | (2009.01) | |
| *H04W 4/90* | (2018.01) | |
| *H04W 84/06* | (2009.01) | |

(52) U.S. Cl.
CPC .............. *H04W 24/04* (2013.01); *H04B 7/04* (2013.01); *H04W 4/029* (2018.02); *H04W 4/90* (2018.02); *H04W 28/24* (2013.01); *H04W 84/06* (2013.01)

(58) Field of Classification Search
CPC ....... H04W 24/04; H04W 4/029; H04W 4/90; H04W 28/24; H04W 84/06; H04B 7/04
USPC ........................................................ 455/404
See application file for complete search history.

(56) References Cited

U.S. PATENT DOCUMENTS

| | | | |
|---|---|---|---|
| 8,401,466 B2 | 3/2013 | Bidigare et al. | |
| 10,038,484 B2 | 7/2018 | Davydov et al. | |
| 10,340,996 B1* | 7/2019 | Wakid .................. | H04B 7/0617 |
| 2008/0151817 A1* | 6/2008 | Fitchett ................ | H04W 28/20 |
| | | | 370/329 |
| 2016/0028472 A1 | 1/2016 | Valencia | |
| 2017/0156044 A1* | 6/2017 | Meredith .............. | H04W 4/025 |
| 2017/0194706 A1* | 7/2017 | Lee ...................... | H04B 7/0619 |
| 2017/0295409 A1 | 10/2017 | Simon et al. | |
| 2018/0026481 A1* | 1/2018 | Ku ...................... | H04L 25/0226 |
| | | | 370/329 |
| 2018/0152856 A1 | 5/2018 | Davydov et al. | |
| 2018/0227394 A1 | 8/2018 | King et al. | |
| 2018/0262239 A1 | 9/2018 | Cariou et al. | |

FOREIGN PATENT DOCUMENTS

CN             206975816             2/2018

\* cited by examiner

*Primary Examiner* — Charles N Appiah
*Assistant Examiner* — Nicole M Louis-Fils
(74) *Attorney, Agent, or Firm* — Amin, Turocy & Watson, LLP

(57) ABSTRACT

Facilitating antenna farm intelligent software defined networking enabled dynamic resource controller networks (e.g., 5G, 6G, and beyond) is provided herein. Operations of a system can comprise evaluating a condition, the condition being at a mobile device, and a characteristic related to a defined network service associated with a connection to the mobile device. The operations can also comprise selectively modifying a quantity of antennas utilized to provide the connection to the mobile device based on the condition being determined to influence a level of service associated with the defined network service.

20 Claims, 10 Drawing Sheets

ANTENNA FARM INTELLIGENT SOFTWARE DEFINED NETWORKING ENABLED DYNAMIC RESOURCE CONTROLLER IN ADVANCED NETWORKS

TECHNICAL FIELD

This disclosure relates generally to the field of mobile communication and, more specifically, to receiver software defined networking enabled procedures in wireless communication systems for advanced networks (e.g., 5G, 6G, and beyond).

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) and/or Sixth Generation (6G) standard for wireless communications. Unique challenges exist to provide levels of service associated with forthcoming 5G, 6G, or other next generation, standards for wireless communication.

BRIEF DESCRIPTION OF THE DRAWINGS

Various non-limiting embodiments are further described with reference to the accompanying drawings in which.

DETAILED DESCRIPTION

Figure 1:
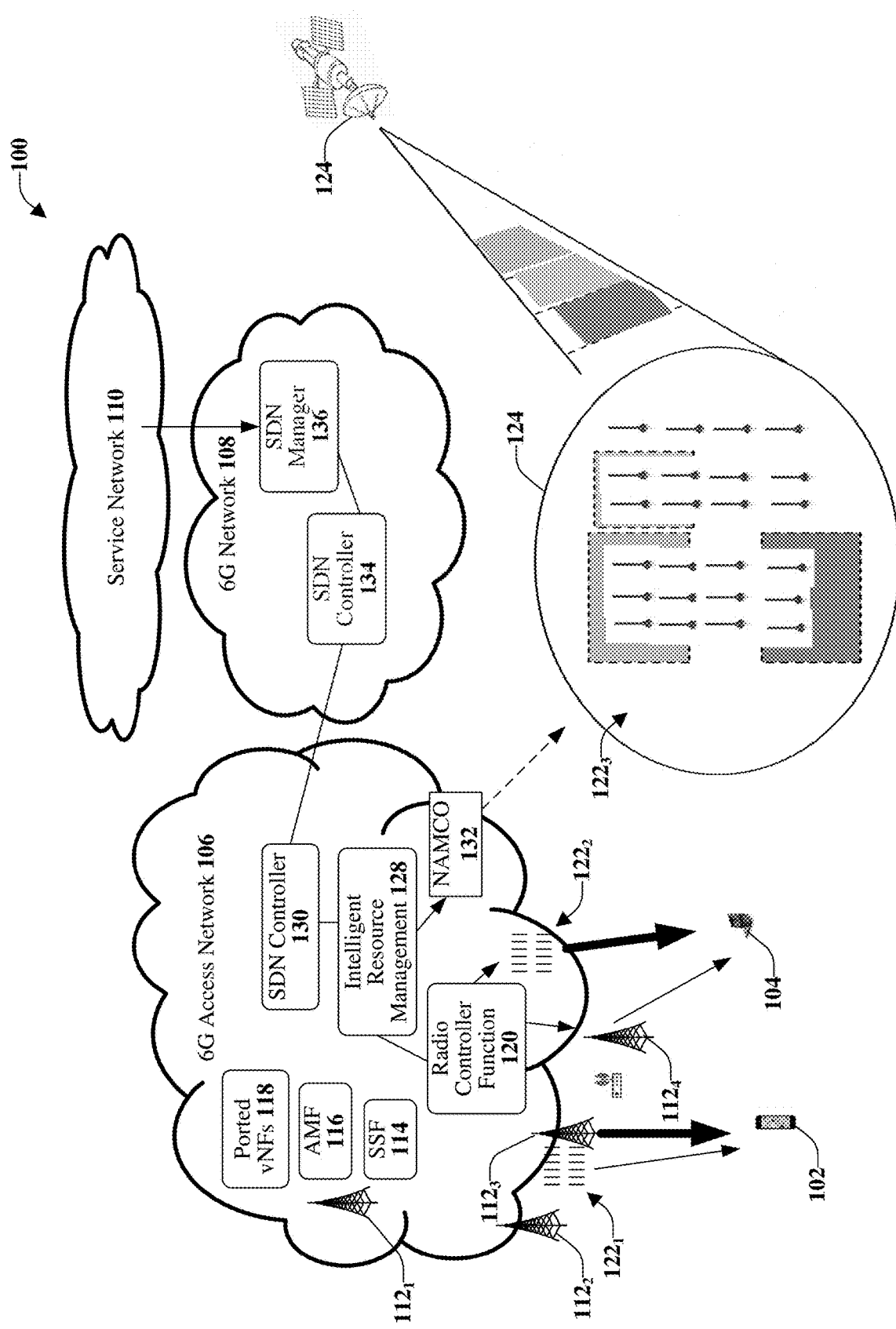
FIG. 1 illustrates an example, non-limiting, communications system for antenna farm intelligent software defined network enabled dynamic resource controller in advanced networks in accordance with one or more embodiments described herein.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details (and without applying to any particular networked environment or standard).

Described herein are systems, methods, articles of manufacture, and other embodiments or implementations that can facilitate an antenna farm intelligent software defined network enabled dynamic resource controller in advanced networks. In one embodiment, described herein is a system that can comprise a processor and a memory that stores executable instructions that, when executed by the processor, facilitate performance of operations. The operations can comprise evaluating a condition, the condition being at a mobile device, and a characteristic related to a defined network service associated with a connection to the mobile device. The operations can also comprise selectively modifying a quantity of antennas utilized to provide the connection to the mobile device based on the condition being determined to influence a level of service associated with the defined network service.

In an example, the condition can be an environmental condition associated with a location of the mobile device. Further to this example, the operations can comprise increasing the quantity of antennas utilized to provide the connection based on a determination that the environmental condition is deteriorating and negatively impacting the defined network service. The environmental condition can be a weather-related condition.

According to some implementations, the mobile device can be a first mobile device, the quantity of antennas can be a first quantity of first antennas, the connection can be a first connection, and the condition can be an emergency situation associated with a location of the first mobile device. Further to these implementations, the operations can comprise increasing the first quantity of first antennas utilized to provide the first connection based on a first determination that the first mobile device is an emergency response device. The operations can also comprise decreasing a second quantity of second antennas utilized to provide a second connection to a second mobile device based on a second determination that the second mobile device is a non-emergency response device. According to some implementations, decreasing the second quantity of second antennas can comprise discontinuing usage of a first antenna of the second quantity of second antennas for the second connection to the second mobile device. Further, increasing the first quantity of first antennas can comprise adding the first antenna to the first quantity of first antennas. In some implementations, the operations can comprise determining the first mobile device is the emergency response device based on credentials of a user identity associated with the first mobile device being determined to be emergency response personnel credentials. In another implementation, decreasing the second quantity of second antennas can comprise temporarily halting information transmitted via the second connection to the second mobile device.

In some implementations, the characteristic related to the defined network service can be a service level subscription agreement defined for the mobile device. According to some implementations, selectively modifying the quantity of antennas can comprise transitioning a communication with the mobile device from an access network to a satellite network.

The access network can be an access network configured to operate according to a fifth generation wireless network communication protocol. Additionally, or alternatively, the satellite network can be a satellite network configured to operate according to a sixth generation wireless network communication protocol.

Another embodiment relates to a method that can comprise ascertaining, by a network device of a communications network, a first profile of a user equipment device and a second profile of a service defined for the user equipment device. The network device can comprise a processor. The method can also comprise determining, by the network device, a change to a condition at a location of the user equipment device. Further, the method can comprise adjusting, by the network device, a parameter associated with the user equipment device, which can comprise compensating for the change to the condition at the location of the user equipment device.

In an implementation, adjusting the parameter can comprise increasing a bandwidth of a communication link provided to the user equipment device. In another implementation, adjusting the parameter can comprise changing a quality of the service during an ongoing communication with the user equipment device. According to another implementation, adjusting the parameter can comprise increasing a quantity of antennas utilized to provide a communication to the user equipment device. In a further implementation, adjusting the parameter can comprise moving a communication with the user equipment device from a radio access network of network devices to a satellite network of satellite devices.

According to some implementations, the condition can be a condition external to the user equipment device that impacts the service defined for the user equipment device. Further to these implementations, adjusting the parameter can comprise altering the parameter to satisfy a defined level associated with the service defined for the user equipment device.

According to another embodiment, provided is a machine-readable storage medium, comprising executable instructions that, when executed by a processor of a device, facilitate performance of operations. The operations can comprise evaluating a condition occurring in connection with a mobile device and a characteristic related to a defined network service associated with a connection to the mobile device. The operations can also comprise selectively modifying a parameter associated with facilitating the connection to the mobile device based on a determination that the condition is expected to impact the defined network service.

According to an implementation, the condition can be an environmental condition associated with a location of the mobile device. The parameter can be a number of antennas in a group of antennas utilized to service the mobile device. Further to this implementation, the operations can comprise increasing the number of antennas in the group of antennas based on the environmental condition being determined to negatively impact the defined network service.

According to some implementations, the condition can be a first condition and the operations can comprise evaluating a second condition at the mobile device after a defined interval. The operations can also comprise selectively modifying the parameter based on a second determination that the second condition is expected to impact the defined network service.

As wireless technology moves forward from LTE and 5G towards more advanced 6G networks, there are a number of areas that can be addressed with the disclosed aspects. For example, an area is the core network and its relation to the service network, the access network, service layer, and the access technologies, as well as the advancement on Internet of Things (IoT) areas. For example, areas such as how the IoT devices will connect to the network, as well as how valued resources, namely the spectrum, can handle such a large demand. The various aspects discussed herein address the satellite communication and its seamless integration to the 6G mobility network.

In the wireless industry, the access network technologies and spectrum should be able to communicate with wireless devices and successfully send and receive data on the ever-growing demand of bandwidth. Some techniques can help to enhance and boost the existing eNodeB for 4G and NR for 5G technologies, however, these techniques are not enough to download the high bandwidth demand ultra HD videos and other large files to the wireless devices. To be able to meet the demand of billions of connected devices in a 6G network, the satellite and its integration with the terrestrial network is discussed herein. While high bandwidth and its relative cheap cost of satellite geo orbiting the covered network is a great fit for the next gen 6G network, the actual physical shortcoming of the technology with up to 4 second of delay and dynamic bandwidth control of the download stream and weather-related inadequacy is addressed with the disclosed aspects.

Referring initially to FIG. 1, illustrated is an example, non-limiting, system 100 for antenna farm intelligent software defined network enabled dynamic resource controller in advanced networks in accordance with one or more embodiments described herein.

As illustrated one or more User Equipment devices (UEs), illustrated as a first UE 102 and a second UE 104, can be communicatively coupled to an access network (e.g., a 6G access network 106). The 6G access network 106 can be communicatively coupled to a 6G network 108 and associated service network 110. The one or more UEs (e.g., the first UE 102 and the second UE 104) can interface with the 6G access network 106 through respective base stations, a few of which are illustrated at base stations $112_1$, $112_2$, $112_3$, and $112_4$.

Included in the 6G access network 106 can be a Services Switching Function (SSF) device 114, an Access Management Function (AMF) device 116, one or more ported network functions virtualization (vNF) devices 118. Also included can be radio controller function device 120 that can communicate with one or more the base stations and/or one or more antenna farms, illustrated as a first antenna farm $122_1$ and a second antenna farm $122_2$. An exploded view of an antenna farm 124 is illustrated. The antenna farm 124 can communicate with one or more satellites 126 of a satellite network.

The radio controller function device 120 can also be communicatively coupled to an intelligent resource management device 128, a Software Defined Networking (SDN controller device 130), and a None Terrestrial Access Management Controller (NAMCO) device (e.g., a NAMCO device 132). Further, the 6G network 108 can comprise a SDN controller device 134 and an SDN manager device 136.

While satellite communication can accrue through a stream of signal from satellite to ground antenna, there can be challenges with signal quality, reception of different bandwidth depending of the amount of data and dynamic of the downstream data as the services demand can change constantly. The various aspects can resolve this challenge, as well as other challenges, with a number of Nano antennas that can be pooled in the access network 106. This can be further communicated to the subscriber (e.g., the first UE 102 and the second UE 104) through the most available access capabilities such as Wi-Fi, 5G NR, and so on. While communication accrues between satellite and other parts of the network, the NAMCO device 132 can communicate with the access management controller function in access slice and coordinate/manage the amount of data streaming through part of Nano antennas for a specific service as illustrated in FIG. 1. The number of Nano antennas chosen for a specific service can change dynamically through NAMCO device 132, depending on the amount of data as well as signal quality coming from the satellite. Since, the signal quality of satellite can vary depending on weather conditions, the Nano antenna can receive the signal and through compare and contrast can reproduce a clear and suable data stream. The quality of the data stream can vary with number of Nano antennas receiving the signals, QoS can be applied to this equation depending of type of service and service level agreement (SLA) with a subscriber.

Further, the various aspects discussed herein can ensure integrity and quality of downstream signal from satellite for a service streamline and reduce data being transmitted over the air. Secure QoS on a downstream according to a service can also be provided with the various aspects. Further, an SDN function for required service can be instantiated on demand Thus, there are no wasted resources.

While the NAMCO device 132 can communicate with the intelligent resource manager in the 6G access slice, it will not be able to control the number of nano antennas assigned for each stream, or each session. It is the N controller in the network that works with STN manager. The STN manager talks to the service network, so it knows what kind of traffic, the quality of experience, the quality of services earmarked for each stream. It knows the importance and the priorities, is it a premium stream, or it just a streaming video, and so on.

Upon or after that is established, it will talk to the NAMCO and a network can be determined and the number of antennas can be changed. For example, when there is a full NANO antenna sending the same packages and it is determined that the packages are not arriving in the correct order or the right quality, the antennas can be changed from four antennas to six antennas (or a different number of antennas). In another example, if there are a large number of antennas and there is another service being used with these antennas and that is taking priority, the number of antennas can be reduced, and their respective manner of processing can be changed. For example, the reduced number of antennas can be compensated for based on a better use of resources.

Therefore, according to various implementations, the quantity of antennas being used for each service and session can be changed dynamically. Further, how this information is being used or processed can be changed through different codec or different algorithms and, if needed, feedback can be provided. In some implementations, the satellite communication can be used as predominantly a secondary means of communication because of the nature of the resource, so in the resource management section, changes can be made related to what other resources need to be engaged for that specific session.

Figure 2:
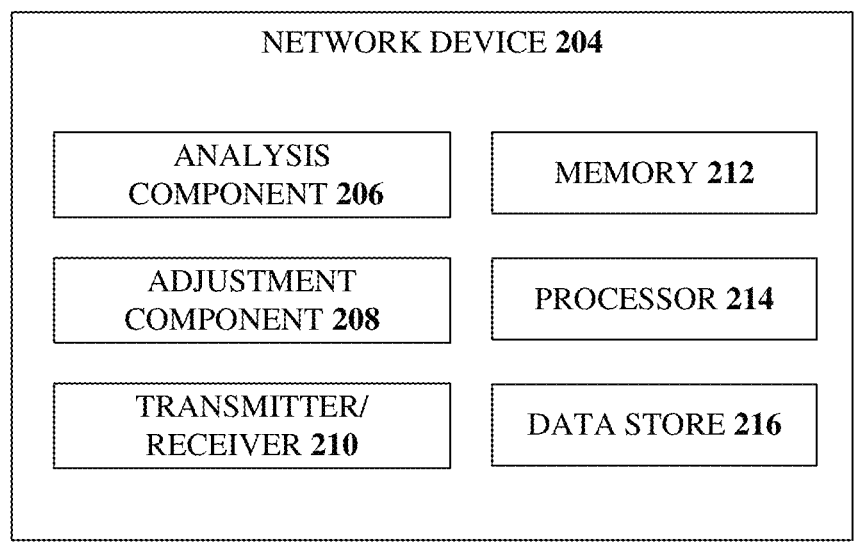
FIG. 2 illustrates an example, non-limiting, system for dynamically adjusting one or more parameters in accordance with one or more embodiments described herein.
Figure 2:
Figure 2:
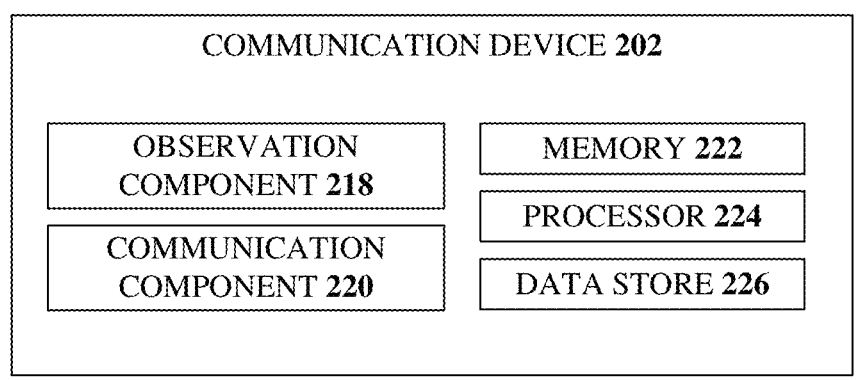

FIG. 2 illustrates an example, non-limiting, system 200 for dynamically adjusting one or more parameters in accordance with one or more embodiments described herein. Repetitive description of like elements employed in other embodiments described herein is omitted for sake of brevity. The system 200 can comprise one or more of the components and/or functionality of the system 100 and vice versa.

As illustrated in FIG. 2, the system 200 can include a communication device 202 and a network device 204. The network device 204 can be included in a group of network devices of a wireless network. Although only a single communication device and a single network device are shown and described, the various aspects are not limited to this implementation. Instead, multiple communication devices and/or multiple network devices can be included in a communications system.

The network device 204 can include an analysis component 206, an adjustment component 208, a transmitter/receiver component 210, at least one memory 212, at least one processor 214, and at least one data store 216. The communication device 202 can include an observation component 218, a communication component 220, at least one memory 222, at least one processor 224, and at least one data store 226.

The analysis component 206 can be configured to evaluate a condition at the communication device 202. For example, the communication device 202 (e.g., via the observation component 218) can monitor and/or receive one or more conditions at the communication device 202. The one or more conditions can be conditions internal to the communication device 202 (e.g., applications executing at (or on) the communication device 202, one or more signal strength measurements and/or other measurements determined by the communication device 202, and so on) and/or conditions external to the communication device 202 (e.g., weather condition, nearby emergency situation, one or more other communication devices, and so on). Information indicative of the one or more conditions monitored and/or received by the observation component 218 can be transmitted to the network device 204 (e.g., via the communication component 220).

Upon or after receiving the information indicative of the condition (e.g., via the transmitter/receiver component 210), the analysis component 206 can evaluate the condition at the communication device 202 and a characteristic related to a defined network service associated with a connection to the communication device 202. The defined network service associated with the connection can be a service defined by a service level agreement between a user of the communication device 202 and a service provider. For example, the defined network service can relate to a download speed, an upload speed, a streaming speed, a quality of service, a bandwidth, and so on. According to some implementations, more than one condition and/or more than one characteristic can be evaluated by the analysis component 206.

Based on a determination that the condition can influence a level of service associated with the defined network service, the adjustment component 208 can selectively modify one or more parameters associated with providing the service to the communication device 202.

According to an implementation, a parameter can be a quantity of antennas utilized to provide the connection to the communication device 202. For example, the condition can be an environmental condition associated with a location of the communication device 202. The location of the communication device 202 can be determined based on various location techniques, including a Global Positioning System (GPS) or other location system integrated with the communication device 202. Continuing the example, the environmental condition can be evaluated, by the analysis component 206 with respect to the defined network service and it can be determined that the environmental condition (e.g. a weather-related condition, such as rain fall, sleet, and so on) is deteriorating and expected to negatively impact the defined network service. Accordingly, the adjustment component 208 can increase the quantity of antennas utilized to provide the connection to compensate for the deteriorating conditions.

In another example, the condition can be an emergency situation (or a situation that becomes an emergency situation) associated with the location of the communication device 202. For example, the emergency situation can be related to a natural disaster (e.g., tornado, earthquake, hurricane, avalanche, forest fire, and so on) or another type of disaster (e.g., building collapse, warfare, mass injury and/or casualty type of event, and so on). A situation that becomes an emergency situation can be, for example, a music concert or sporting event where a fire starts and, due to people attempting to leave the area, a stampede occurs, and people are injured. In these types of situations, the observation component 218 can provide data that indicates the evolving situation (e.g., an emergency call initiated at the communication device) or based on indications from one or more other communication devices around or near the communication device 202 (e.g., emergency calls are being placed by one or more of the other communications devices in the area). According to some implementations, the emergency situation can be determined based on an amount of bandwidth being requested by the communications devices in a geographic area (e.g., a large number of calls or other types of communication (e.g., texts) are being attempted than what is considered usual for the area). Based on a determination that an emergency situation is occurring, the adjustment component 208 can modify one or more parameters related to the communication device 202 and/or another device.

The transmitter/receiver component 210 (and/or the communication component 220) can be configured to transmit to (and/or receive data from) the communication device 202 (or the network device 204), other network devices, and/or other communication devices. Through the transmitter/receiver component 210 (and/or the communication component 220), the network device 204 (and/or the communication device 202) can concurrently transmit and receive data, can transmit and receive data at different times, or combinations thereof. According to some implementations, the transmitter/receiver component 210 (and/or the communication component 220) can facilitate communications between an identified entity associated with the communication device 202 (e.g., an owner of the communication device 202, a user of the communication device 202, and so on). Further, the transmitter/receiver component 210 (and/or the communication component 220) can be configured to receive, from the network device 204 or other network devices, multimedia content.

The at least one memory 212 can be operatively connected to the at least one processor 214. Further, the at least one memory 222 can be operatively connected to the at least one processor 224. The memories (e.g., the at least one memory 212, the at least one memory 222) can store executable instructions that, when executed by the processors (e.g., the at least one processor 214, the at least one processor 224) can facilitate performance of operations. Further, the processors can be utilized to execute computer executable components stored in the memories.

For example, the memories can store protocols associated with antenna farm intelligent software defined networking enabled dynamic resource controllers as discussed herein. Further, the memories can facilitate action to control communication between the communication device 202 and the network device 204 such that the system 200 can employ stored protocols and/or algorithms to achieve improved communications in a wireless network as described herein.

The memories can store respective protocols associated with antenna farm intelligent software defined networking enabled dynamic resource controllers, taking action to control communication between the communication device 202 and the network device 204, such that the system 200 can employ stored protocols and/or algorithms to achieve improved communications in a wireless network as described herein. It should be appreciated that data stores (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

The processors can facilitate respective analysis of information related to antenna farm intelligent software defined networking enabled dynamic resource controller in a communication network. The processors can be processors dedicated to analyzing and/or generating information received, a processor that controls one or more components of the system 200, and/or a processor that both analyzes and generates information received and controls one or more components of the system 200.

Further, the term network device (e.g., network node, network node device) is used herein to refer to any type of network node serving communication devices and/or connected to other network nodes, network elements, or another network node from which the communication devices can receive a radio signal. In cellular radio access networks (e.g., universal mobile telecommunications system (UMTS) networks), network nodes can be referred to as base transceiver stations (BTS), radio base station, radio network nodes, base stations, NodeB, eNodeB (e.g., evolved NodeB), and so on. In 5G terminology, the network nodes can be referred to as gNodeB (e.g., gNB) devices. Network nodes can also comprise multiple antennas for performing various transmission operations (e.g., MIMO operations). A network node can comprise a cabinet and other protected enclosures, an antenna mast, and actual antennas. Network nodes can serve several cells, also called sectors, depending on the configuration and type of antenna. Examples of network nodes (e.g., network device 204) can include but are not limited to: NodeB devices, base station (BS) devices, access point (AP) devices, and radio access network (RAN) devices. The network nodes can also include multi-standard radio (MSR) radio node devices, comprising: an MSR BS, an eNode B, a network controller, a radio network controller (RNC), a base station controller (BSC), a relay, a donor node controlling relay, a base transceiver station (BTS), a transmission point, a transmission node, an Remote Radio Unit (RRU), a Remote Radio Head (RRH), nodes in distributed antenna system (DAS), and the like.

Figure 3:
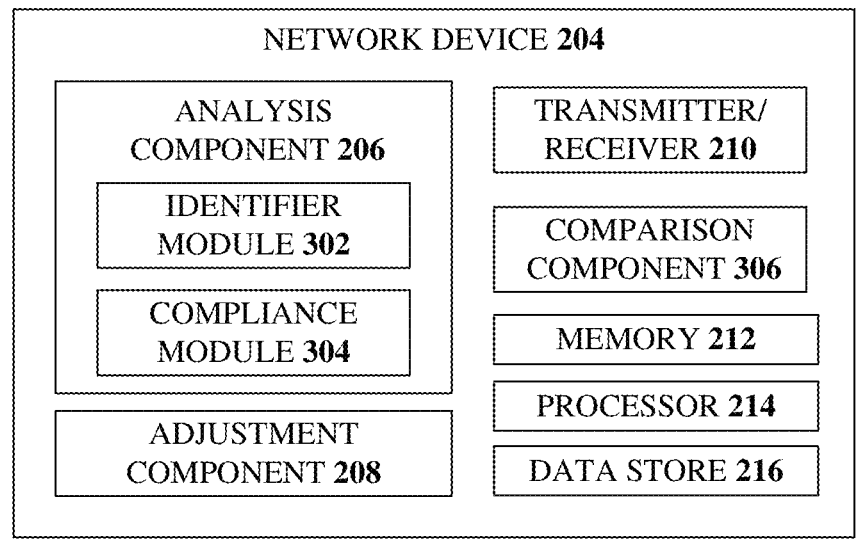
FIG. 3 illustrates an example, non-limiting, system for dynamically adjusting one or more antennas in accordance with one or more embodiments described herein.
Figure 3:
Figure 3:
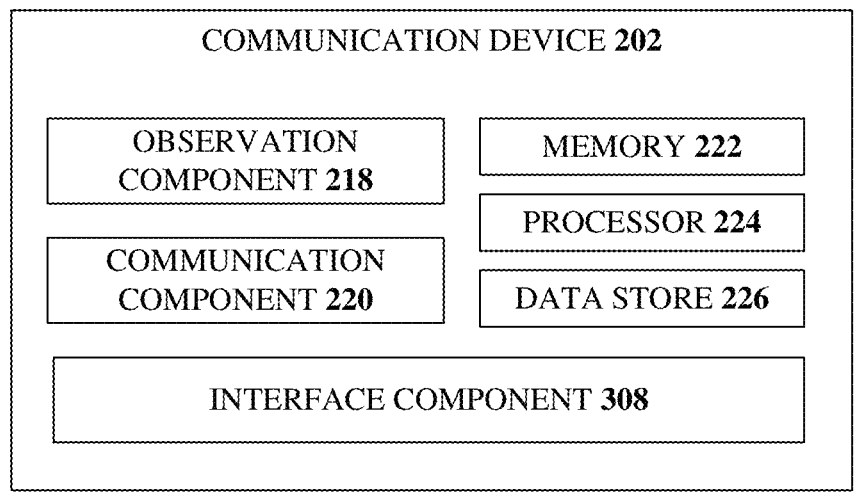

FIG. 3 illustrates an example, non-limiting, system 300 for dynamically adjusting one or more antennas in accordance with one or more embodiments described herein. Repetitive description of like elements employed in other embodiments described herein is omitted for sake of brevity.

The system 300 can comprise one or more of the components and/or functionality of the system 100, and/or the system 200, and vice versa. As illustrated, the network device 204 can comprise an identifier module 302 that can be configured to ascertain a first profile of the communication device 202. For example, the first profile can be a type of the device (e.g., device capabilities) and/or a profile of a user associated with the communication device. The profile of the user can indicate whether the user should have preferential treatment (e.g., a doctor in an emergency situation, a firefighter in an emergency situation related to a fire or building collapse, and so on).

Further, a compliance module 304 can be configured to ascertain a second profile of a service defined for the communication device 202. For example, the second profile can be associated with a service level agreement established with the communication device 202. For example, the service level agreement can specify the level of service (e.g., bandwidth, reliability, and other parameters) that should be consistently available for the communication device 202.

According to some implementations, consideration can be given, not just to the amount of information that is being download to the network, but also the quality of the information, quality of the stream, timing, and/or CRC (e.g., with respect to a packet, is it necessary to oversample information coming in the packet to ensure the packet is intact (e.g., the entire packet is received)).

A comparison component 306 can be configured to determine whether a change to a condition at a location of the communication device 202 will cause a corresponding change to the second profile. For example, the analysis component 206 can determine that the condition has changed at the communication device 202 (e.g., change to a weather condition, change to an ongoing situation, and so on). Based on this condition change, the comparison component 306 can determine the impact the condition change will have on the level of service and the associated impact on the service level agreement. For example, the comparison component 306 can determine whether the condition change is expected to cause the level of service to fall below a minimum service threshold level established by the service level agreement. The result of the analysis by the comparison component 306 can be communicated to the adjustment component 208.

If the determination is that the condition change will negatively impact the level of service, the adjustment component 208 can take one or more actions to mitigate the effects. For example, according to an implementation, the adjustment component can move an ongoing (or a future) communication from an access network to a satellite network. For example, moving to the satellite network can comprise increase a number of antennas utilized to service the communication device 202.

According to some implementations, a first quantity of first antennas utilized for a first device can be increased while, at substantially the same time, a second quantity of second antennas for a second device can be decreased. For example, the identifier module 302 can determine that the first device is an emergency response device and the analysis component 206 can determine that the device is in an emergency response situation (e.g., a disaster has occurred). A first user associated with the first device could be doctor that needs to perform a surgery "in the field" and needs to access information over the first device (e.g., a video discussing how to perform the surgery, communication with a colleague regarding the surgery, and so on). In contrast, a second user associated with the second device is performing a non-emergency related task (e.g., watching a video). Therefore, the adjustment component 208 can determine that the first device should have premium resources, at least during the emergency situation or during the surgery, and can move resources from the second device and use those resources for the first device.

According to some implementations, a priority application can be provided additional resources prior to another application. For example, when a session is established, and a service engaged, the service and session are already being checked with the profile of the user and profile of the service. Thus, the priority can be predetermined. However, one or more services can be dynamically changed in mid-service and its priority can be increased. For example, a user is watching a video stream and the stream becomes choppy. The user can be presented with an option (e.g., through an interface component 308), to increase the bandwidth.

In another example, the weather changes and it affects the application. There can be a service level agreement promise to the customer and, therefore, the codec or the number of elements for that video application will need to be changed to conform to the promise. This can be performed through a feedback mechanism, to indicate that to this time the video is choppy. In another example, this can be performed proactively when a weather change is detected in the area, it might be determined that it might have an impact to video service, so another antenna element can be added for the service, based on the application needs in SLA, so there can be some intelligence (e.g., inference) and dynamically change the antenna elements.

In another example of a disaster area (e.g., an emergency situation), it could be the case where there can be no acceptance of any degradation of the communication. Thus, that communication will get a priority, which can be a predefined priority, or it can be adjusted to be a priority session. For example, if in the emergency situation a user is performing surgery and needs information on device and another person, in the general geographic area, is watching a streaming video, the video can be stopped or only one antenna can be given to that service. Accordingly, based on an understanding of the nature of the session, which can be determined based on interaction with the service network (SDM manager), and a pre-agreed service level, changes can be performed automatically.

The communication device 202 can comprise the interface component 308 through which a user can request more parameters. For example, if the user is streaming a video that is slow or does not stream correctly, the user could request more bandwidth. Such request can be facilitated by one or more selections provided on the communication device 202. According to another example, a user is in a foreign country and does not want to use the provider service because of the tariff and agreement related to roaming services. Therefore, the user can dynamically change the service to satellite. This can reduce the costs of streaming and/or using the data.

According to some implementations, the interface component 308 (as well as other interface components discussed herein) can provide a Graphical User Interface (GUI), a command line interface, a speech interface, Natural Language text interface, and the like. For example, a GUI can be rendered that provides an entity with a region or means to load, import, select, read, and so forth, various requests and can include a region to present the results of the various requests. These regions can include known text and/or graphic regions that include dialogue boxes, static controls, drop-down-menus, list boxes, pop-up menus, as edit controls, combo boxes, radio buttons, check boxes, push buttons, graphic boxes, and so on. In addition, utilities to facilitate the information conveyance, such as vertical and/or horizontal scroll bars for navigation and toolbar buttons to determine whether a region will be viewable, can be employed. Thus, it might be inferred that the entity did want the action performed.

The entity can also interact with the regions to select and provide information through various devices such as a mouse, a roller ball, a keypad, a keyboard, a pen, gestures captured with a camera, a touch screen, and/or voice activation, for example. According to an aspect, a mechanism, such as a push button or the enter key on the keyboard, can be employed subsequent to entering the information in order to initiate information conveyance. However, it is to be appreciated that the disclosed aspects are not so limited. For example, merely highlighting a check box can initiate information conveyance. In another example, a command line interface can be employed. For example, the command line interface can prompt the entity for information by providing a text message, producing an audio tone, or the like. The entity can then provide suitable information, such as alphanumeric input corresponding to an option provided in the interface prompt or an answer to a question posed in the prompt. It is to be appreciated that the command line interface can be employed in connection with a GUI and/or Application Program Interface (API). In addition, the command line interface can be employed in connection with hardware (e.g., video cards) and/or displays (e.g., black and white, and Video Graphics Array (VGA)) with limited graphic support, and/or low bandwidth communication channels.

Figure 4:
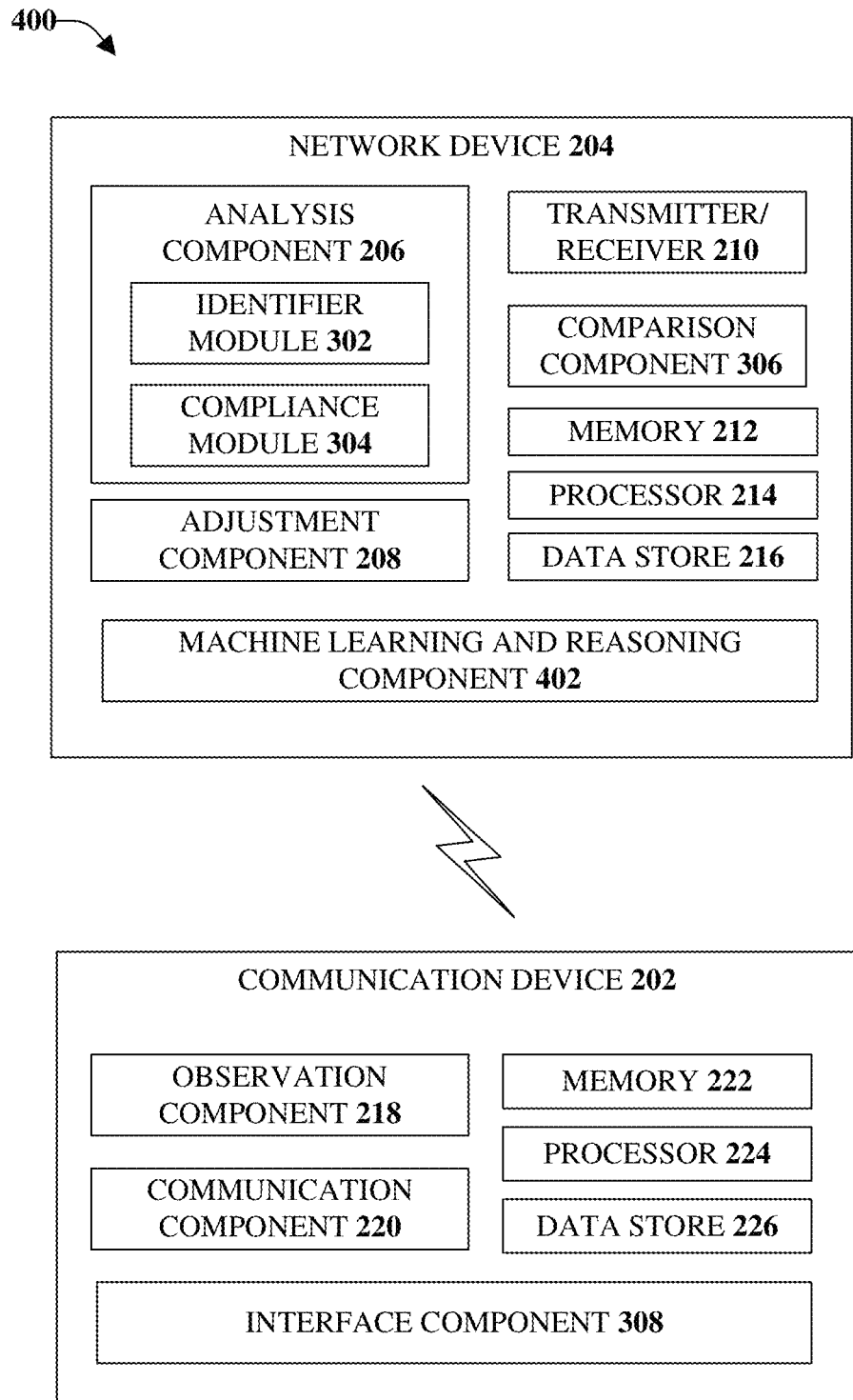
FIG. 4 illustrates an example, non-limiting, system that employs automated learning to facilitate one or more of the disclosed aspects in accordance with one or more embodiments described herein.

FIG. 4 illustrates an example, non-limiting, system 400 that employs automated learning to facilitate one or more of the disclosed aspects in accordance with one or more embodiments described herein. Repetitive description of like elements employed in other embodiments described herein is omitted for sake of brevity. The system 400 can comprise one or more of the components and/or functionality of the system 100, the system 200, and/or the system 300, and vice versa.

According to some implementations, the system 400 can comprise a machine learning and reasoning component 402 that can be utilized to automate one or more of the disclosed aspects. The machine learning and reasoning component 402 can employ automated learning and reasoning procedures (e.g., the use of explicitly and/or implicitly trained statistical classifiers) in connection with performing inference and/or probabilistic determinations and/or statistical-based determinations in accordance with one or more aspects described herein.

For example, the machine learning and reasoning component 402 can employ principles of probabilistic and decision theoretic inference. Additionally, or alternatively, the machine learning and reasoning component 402 can rely on predictive models constructed using machine learning and/or automated learning procedures. Logic-centric inference can also be employed separately or in conjunction with probabilistic methods.

The machine learning and reasoning component 402 can infer whether one or more parameters associated with a device should be changed, when to change the one or more parameters, whether one device should have priority over another device, and so on. Such inference can be performed by the machine learning and reasoning component 402 by obtaining knowledge about the communication device 202, the network device 204, the communication network, the applications executing on the communication device 202, a condition at the communication device 202, an environment of the communication device, service level agreement information, device (e.g., communication device 202, network device 204) preferences, and so on. The inference can be performed at about the same time as a change has been detected or based on other data (e.g., a request is received from a user of the communication device 202 (e.g., via the communication component 220) and/or at about the same time as information indicative of location information is received.

Based on this knowledge, the machine learning and reasoning component 402 can make an inference based on which parameter should be modified, whether more than one parameter should be modified, whether the communication device 202 should be handed off to a satellite network, or combinations thereof.

As used herein, the term "inference" refers generally to the process of reasoning about or inferring states of a system, a component, a module, an environment, and/or devices from a set of observations as captured through events, reports, data and/or through other forms of communication. Inference can be employed to identify a specific context or information, or can generate a probability distribution over states, for example. The inference can be probabilistic. For example, computation of a probability distribution over states of interest based on a consideration of data and/or conditions. The inference can also refer to techniques employed for composing higher-level information from a set of conditions and/or data. Such inference can result in the construction of new conditions and/or actions from a set of observed conditions and/or stored conditions data, whether or not the conditions are correlated in close temporal proximity, and whether the conditions and/or data come from one or several conditions and/or data sources. Various classification procedures and/or systems (e.g., support vector machines, neural networks, logic-centric production systems, Bayesian belief networks, fuzzy logic, data fusion engines, and so on) can be employed in connection with performing automatic and/or inferred action in connection with the disclosed aspects.

The various aspects (e.g., in connection with updating one or more parameters associated with a communication device, providing more antennas, providing less antennas, using a satellite network, and so forth) can employ various artificial intelligence-based procedures for carrying out various aspects thereof.

A classifier is a function that maps an input attribute vector, $x=(x1, x2, x3, x4, xn)$, to a confidence that the input belongs to a class. In other words, $f(x)=confidence(class)$. Such classification can employ a probabilistic and/or statistical-based analysis (e.g., factoring into the analysis utilities and costs) to provide a prognosis and/or infer one or more actions that should be employed to determine what parameters should be automatically changed at a particular moment in time (e.g., at about the same time as a request is received from the communication device 202, at about the same time as information indicative of a location is received at the communication device 202 and/or the network device 204, at about the same time as a condition at the communication device 202 changes, and so on).

A Support Vector Machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that can be similar, but not necessarily identical to training data. Other directed and undirected model classification approaches (e.g., naïve Bayes, Bayesian networks, decision trees, neural networks, fuzzy logic models, and probabilistic classification models) providing different patterns of independence can be employed. Classification as used herein, can be inclusive of statistical regression that is utilized to develop models of priority.

One or more aspects can employ classifiers that are explicitly trained (e.g., through a generic training data) as well as classifiers that are implicitly trained (e.g., by observing environmental conditions, by receiving extrinsic information about device location, by determining an effect of a condition with respect to a service level agreement, and so on). For example, SVM's can be configured through a learning or training phase within a classifier constructor and feature selection module. Thus, a classifier(s) can be used to automatically learn and perform a number of functions, including, but not limited to, determining according to a predetermined criteria which communication device should have priority, when to provide more antennas to a device (e.g., handover the device to a satellite network), when to provide less antennas to a device (e.g., handover the device from the satellite network to an access network, when to provide a device more (or less) bandwidth and so forth. The criteria can include, but is not limited to, environmental conditions, location conditions, historical information, and so forth.

Figure 5:
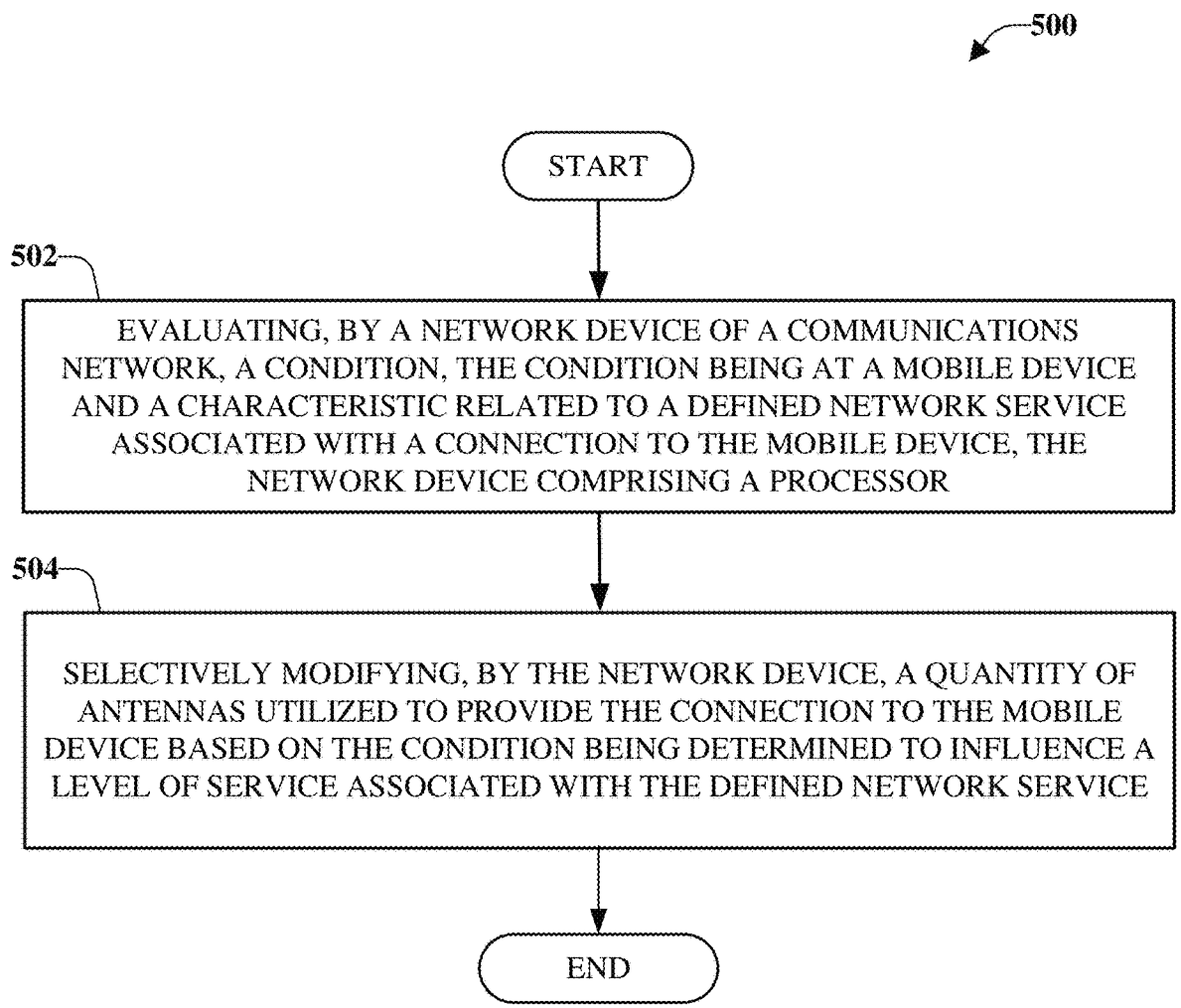
FIG. 5 illustrates a flowchart of an example, non-limiting, method for a software defined networking enabled dynamic resource controller for advanced networks in accordance with one or more embodiments described herein.

FIG. 5 illustrates a flowchart of an example, non-limiting, method 500 for a software defined networking enabled dynamic resource controller for advanced networks in accordance with one or more embodiments described herein. Repetitive description of like elements employed in other embodiments described herein is omitted for sake of brevity.

Although FIG. 5 is illustrated and described with respect to a specific implementation (e.g., a network device), the disclosed aspects are not limited to this implementation. In some implementations, a system comprising a processor can perform the method 500 and/or other methods discussed herein. In other implementations, a device comprising a processor can perform the method 500 and/or other methods discussed herein. In other implementations, a machine-readable storage medium, can comprise executable instructions that, when executed by a processor, facilitate performance of operations, which can be the operations discussed with respect to the method 500 and/or other methods discussed herein.

The method 500 can start, at 502, when a condition at a mobile device and a characteristic related to a defined network service associated with a connection to the mobile device are evaluated (e.g., via the analysis component 206). In an example, the condition can be an environmental condition associated with a location of the mobile device. The environmental condition can be a weather-related condition, an emergency condition, or another condition.

Further, at 504, the method 500 can comprise selectively modifying a resource utilized to provide the connection to the mobile device based on the condition being determined to influence a level of service associated with the defined network service (e.g., via the adjustment component 208). For example, the resource can be a quantity of antennas utilized to service the mobile device. In one example, the mobile device could be accessing the network over an access link (e.g., the 6G access network 106 of FIG. 1). Due to one or more conditions, the mobile device could be moved to a satellite network. For example, the access link can be to an access network configured to operate according to a fifth generation wireless network communication protocol. Further, the satellite network can be a satellite network configured to operate according to a sixth generation wireless network communication protocol.

Figure 6:
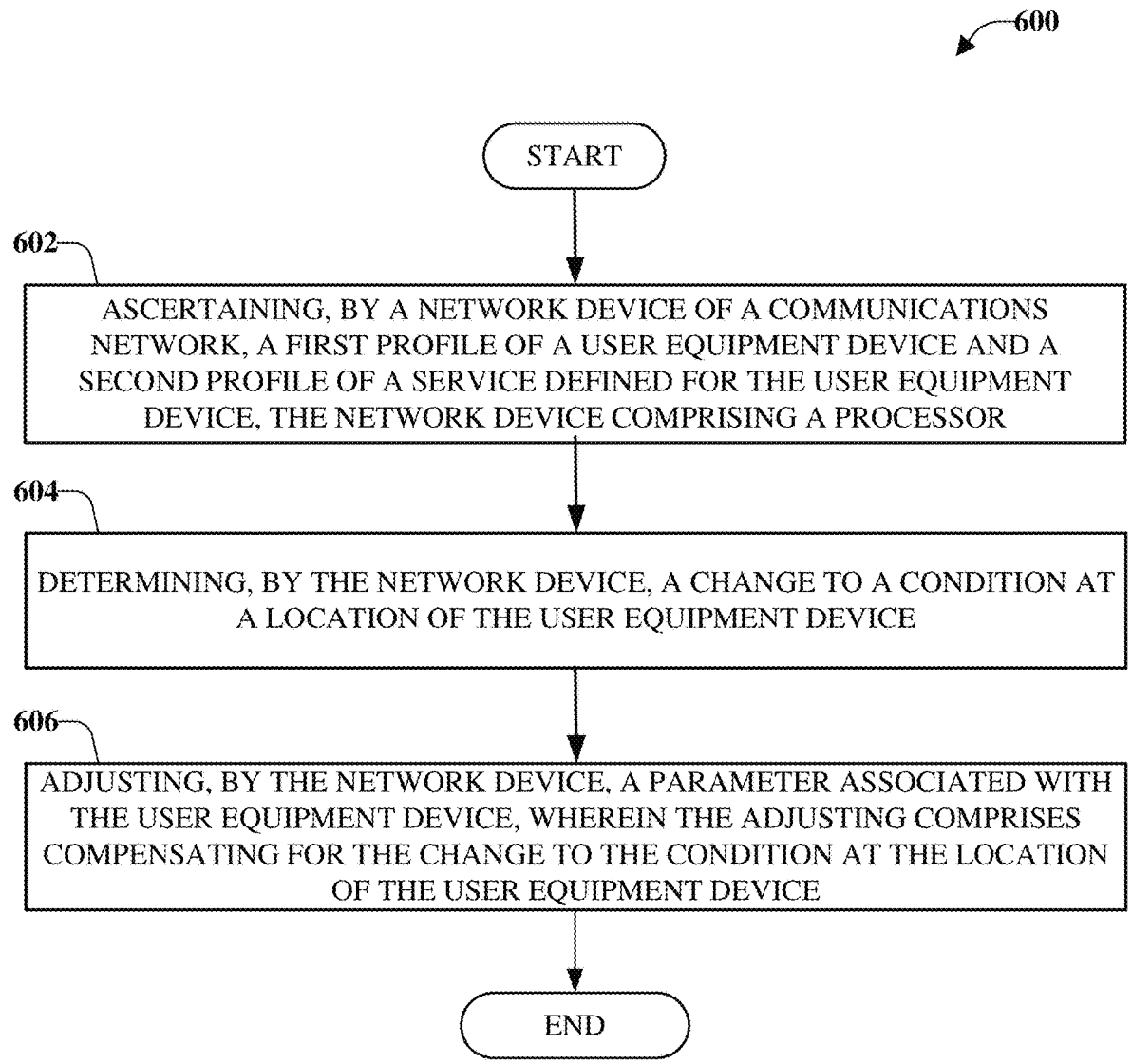
FIG. 6 illustrates a flowchart of an example, non-limiting, method for changing one or more parameters based on a detected condition for advanced networks in accordance with one or more embodiments described herein.

FIG. 6 illustrates a flowchart of an example, non-limiting, method 600 for changing one or more parameters based on a detected condition for advanced networks in accordance with one or more embodiments described herein. Repetitive description of like elements employed in other embodiments described herein is omitted for sake of brevity.

The method 600 can start, at 602 with ascertaining a first profile of a user equipment device and a second profile of a service defined for the user equipment device (e.g., via the identifier module 302). Further, at 604 it can be determined that a change to a condition at a location of the user equipment device has occurred (e.g., via the analysis component 206). For example, the condition can be a condition external to the user equipment device that can impact the service defined for the user equipment device.

At 606, a parameter associated with the user equipment device can be adjusted (e.g., via the adjustment component 208). The adjustment can comprise compensating for the change to the condition at the location of the user equipment device. Thus, if the condition is expected to impact the service defined for the user equipment device, the adjustment can comprise altering the parameter to satisfy a defined level associated with the service defined for the user equipment device.

In an example, adjusting the parameter can comprise increasing a bandwidth of a communication link provided to the user equipment device. In another example, adjusting the parameter can comprise changing a quality of the service during an ongoing communication with the user equipment device. According to another example, adjusting the parameter can comprise increasing a quantity of antennas utilized to provide a communication to the user equipment device. In a further example, adjusting the parameter can comprise moving a communication with the user equipment device from a radio access network of network devices to a satellite network of satellite devices.

Figure 7:
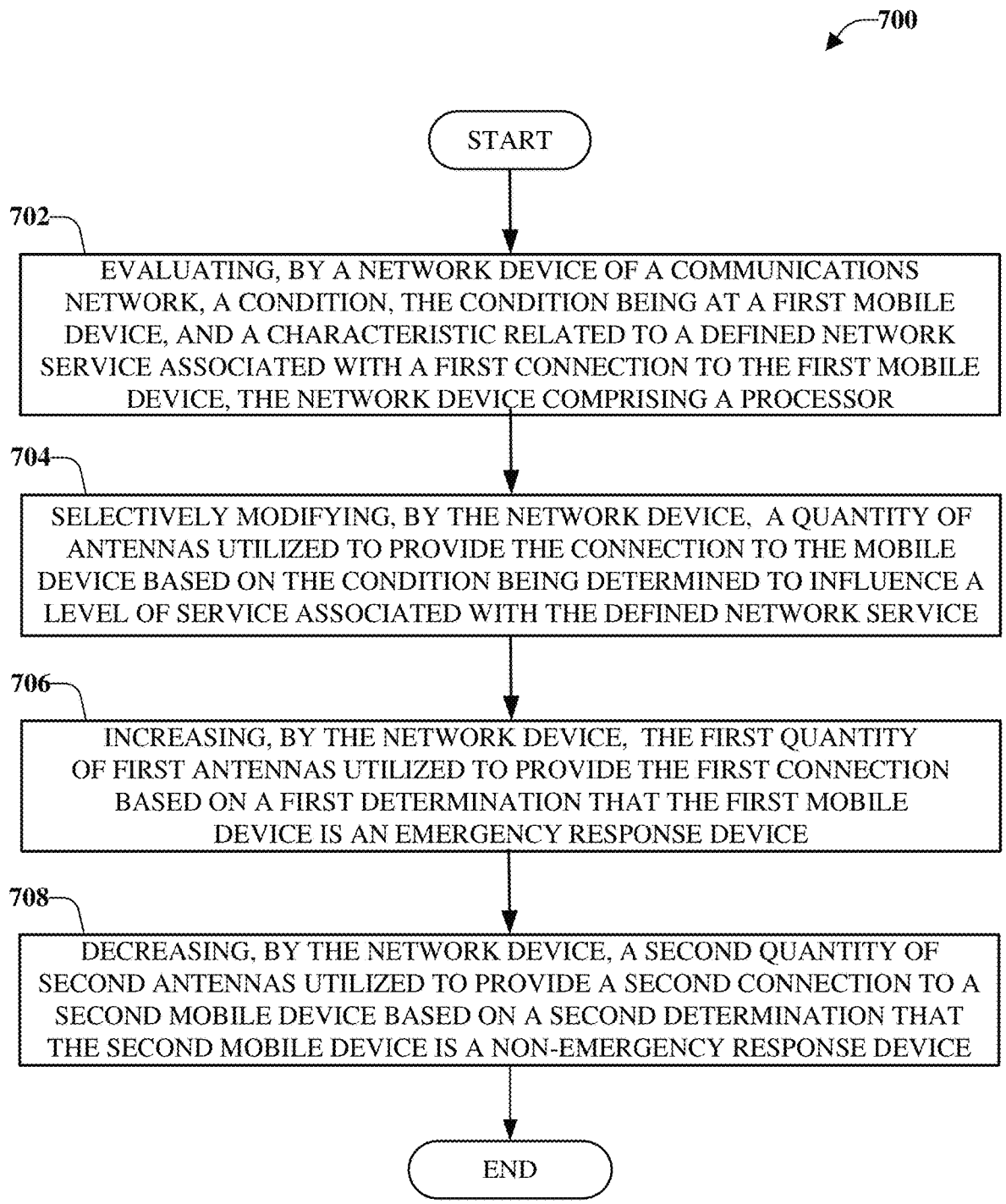
FIG. 7 illustrates a flowchart of an example, non-limiting, method for changing from an access network to a satellite network to increase a quantity of available antennas in accordance with one or more embodiments described herein.

FIG. 7 illustrates a flowchart of an example, non-limiting, method 700 for changing from an access network to a satellite network to increase a quantity of available antennas in accordance with one or more embodiments described herein. Repetitive description of like elements employed in other embodiments described herein is omitted for sake of brevity.

At 702, a condition and a characteristic related to a defined network service associated with a first connection to a first mobile device can be evaluated (e.g., via the analysis component 206). The condition can be at the first mobile device. According to some implementations, the characteristic related to the defined network service can be a service level subscription agreement defined for the mobile device.

Further, at 704, a first quantity of antennas utilized to provide the connection to the first mobile device can be selectively modified based on the condition being determined to influence a level of service associated with the defined network service (e.g., via the adjustment component 208). According to some implementations, selectively modifying the quantity of antennas can comprise transitioning a communication with the mobile device from an access network to a satellite network.

The method 700 can continue, at 706, a first quantity of first antennas utilized to provide the first connection can be increased (e.g., via the adjustment component 208). The increase to the first quantity of antennas can be based on a first determination that the first mobile device is an emergency response device. In some implementations, determining the first mobile device is the emergency response device can be based on credentials of a user identity associated with the first mobile device being determined to be emergency response personnel credentials.

At 708, a second quantity of second antennas utilized to provide a second connection to a second mobile device can be decreased (e.g., via the adjustment component 208). For example, decreasing the second quantity of second antennas can be based on a second determination that the second mobile device is a non-emergency response device. In some implementations, decreasing the second quantity of second antennas can comprise temporarily halting information transmitted via the second connection to the second mobile device.

According to some implementations, decreasing the second quantity of second antennas can comprise discontinuing usage of at least a first antenna of the second quantity of second antennas for the second connection to the second mobile device. Further to these implementations, increasing the first quantity of first antennas can comprise adding at least the first antenna to the first quantity of first antennas. Thus, usage of antennas can be moved from servicing the second device to servicing the first device in this example.

Figure 8:
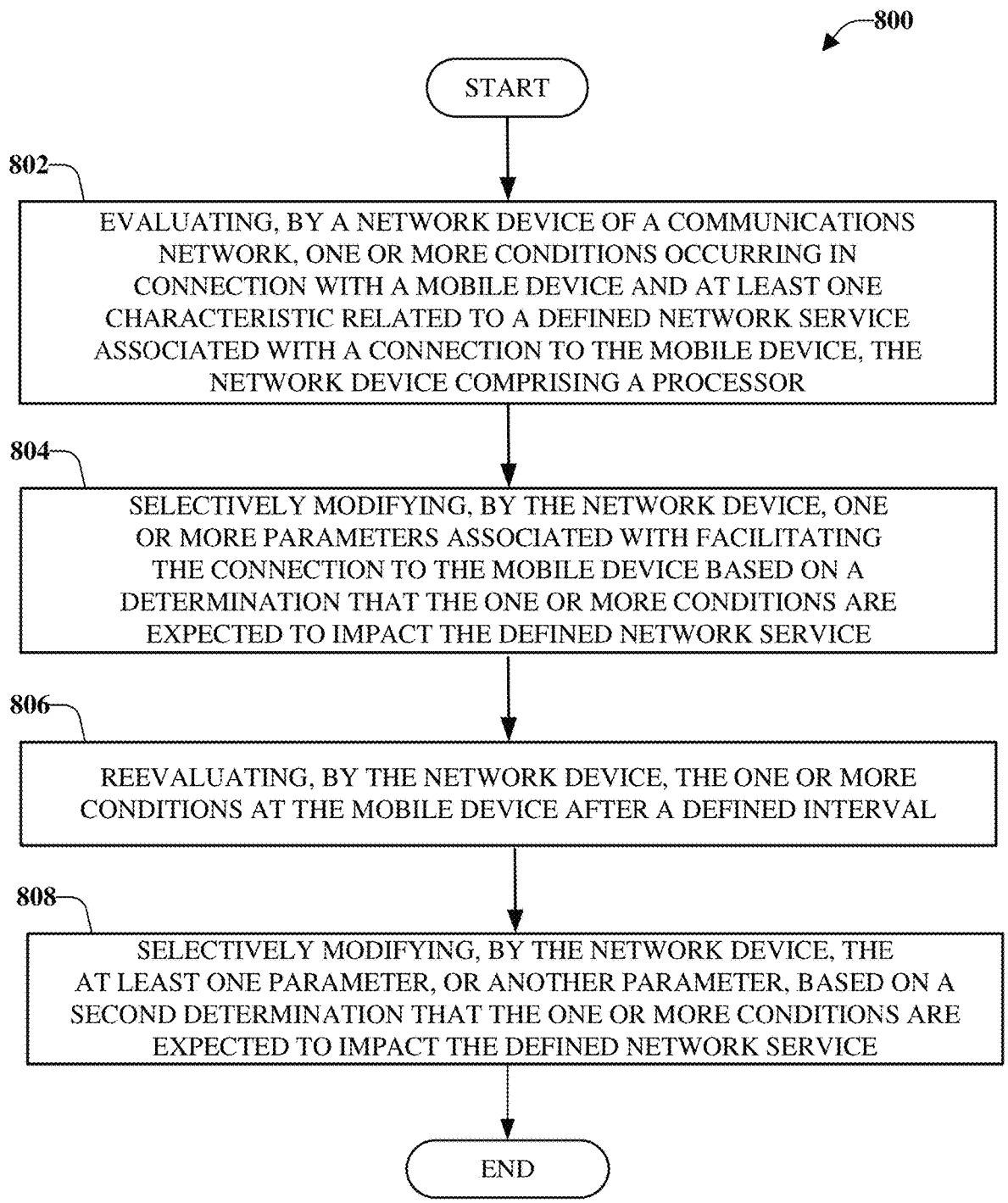
FIG. 8 illustrates a flowchart of an example, non-limiting, method for providing a feedback loop to selectively modify one or more parameters associated with one or more mobile devices for advanced networks in accordance with one or more embodiments described herein.

FIG. 8 illustrates a flowchart of an example, non-limiting, method 800 for providing a feedback loop to selectively modify one or more parameters associated with one or more mobile devices for advanced networks in accordance with one or more embodiments described herein. Repetitive description of like elements employed in other embodiments described herein is omitted for sake of brevity.

The method 800 starts at 802 with evaluating one or more conditions occurring in connection with a mobile device and at least one characteristic related to a defined network service associated with a connection to the mobile device (e.g., via the analysis component 206). At 804, one or more parameters associated with facilitating the connection to the mobile device can be selectively modified (e.g., via the adjustment component 208). For example, the modification can be based on a determination that the one or more conditions are expected to impact the defined network service.

For example, a condition of the one or more conditions can be an environmental condition associated with a location of the mobile device. Further to this example, the at least one parameter can be a number (or quantity) of antennas in a group of antennas utilized to service the mobile device. Thus, in this example, the method can comprise increasing the number of antennas in the group of antennas based on the environmental condition being determined to negatively impact the defined network service.

The method 800 can also comprise, at 806, reevaluating the one or more conditions at the mobile device after a defined interval (e.g., via the analysis component 206). Based on the reevaluation, at 808, the at least one parameter, or another parameter, can be selectively modified based on a second determination that the one or more conditions are expected to impact the defined network service (e.g., via the adjustment component 208).

While, for purposes of simplicity of explanation, some methods are shown and described as a series of blocks, it is to be understood and appreciated that the disclosed aspects are not limited by the number or order of blocks, as some blocks can occur in different orders and/or at substantially the same time with other blocks from what is depicted and described herein. Moreover, not all illustrated blocks can be required to implement the disclosed methods. It is to be appreciated that the functionality associated with the blocks can be implemented by software, hardware, a combination thereof, or any other suitable means (e.g. device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

Described herein are systems, methods, articles of manufacture, and other embodiments or implementations that can facilitate antenna farm intelligent software defined networking enabled dynamic resource controller in advanced networks. Facilitating antenna farm intelligent software defined networking enabled dynamic resource controller in advanced networks can be implemented in connection with any type of device with a connection to the communications network (e.g., a mobile handset, a computer, a handheld device, etc.) any Internet of things (IoT) device (e.g., toaster, coffee maker, blinds, music players, speakers, etc.), and/or any connected vehicles (cars, airplanes, space rockets, and/or other at least partially automated vehicles (e.g., drones)). In some embodiments, the non-limiting term User Equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, Laptop Embedded Equipped (LEE), laptop mounted equipment (LME), USB dongles etc. Note that the terms element, elements and antenna ports can be interchangeably used but carry the same meaning in this disclosure. The embodiments are applicable to single carrier as well as to Multi-Carrier (MC) or Carrier Aggregation (CA) operation of the UE. The term Carrier Aggregation (CA) is also called (e.g., interchangeably called) "multi-carrier system," "multi-cell operation," "multi-carrier operation," "multi-carrier" transmission and/or reception.

In some embodiments, the non-limiting term radio network node or simply network node is used. It can refer to any type of network node that serves one or more UEs and/or that is coupled to other network nodes or network elements or any radio node from where the one or more UEs receive a signal. Examples of radio network nodes are Node B, Base Station (BS), Multi-Standard Radio (MSR) node such as MSR BS, eNode B, network controller, Radio Network Controller (RNC), Base Station Controller (BSC), relay, donor node controlling relay, Base Transceiver Station (BTS), Access Point (AP), transmission points, transmission nodes, Remote Radio Unit (RRU), Remote Radio Head (RRH), nodes in Distributed Antenna System (DAS) etc.

Cloud Radio Access Networks (RAN) can enable the implementation of concepts such as Software-Defined Network (SDN) and Network Function Virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open Application Programming Interfaces (APIs) and move the network core towards an all Internet Protocol (IP), cloud based, and software driven telecommunications network. The SDN controller can work with, or take the place of, Policy and Charging Rules Function (PCRF) network elements so that policies such as quality of service and traffic management and routing can be synchronized and managed end to end.

The various aspects described herein can relate to New Radio (NR), which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

As used herein, "5G" can also be referred to as NR access. Accordingly, systems, methods, and/or machine-readable storage media for facilitating channel state information determination and reporting in wireless communication systems for advanced networks are desired. As used herein, one or more aspects of a 5G network can comprise, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE.

Figure 9:
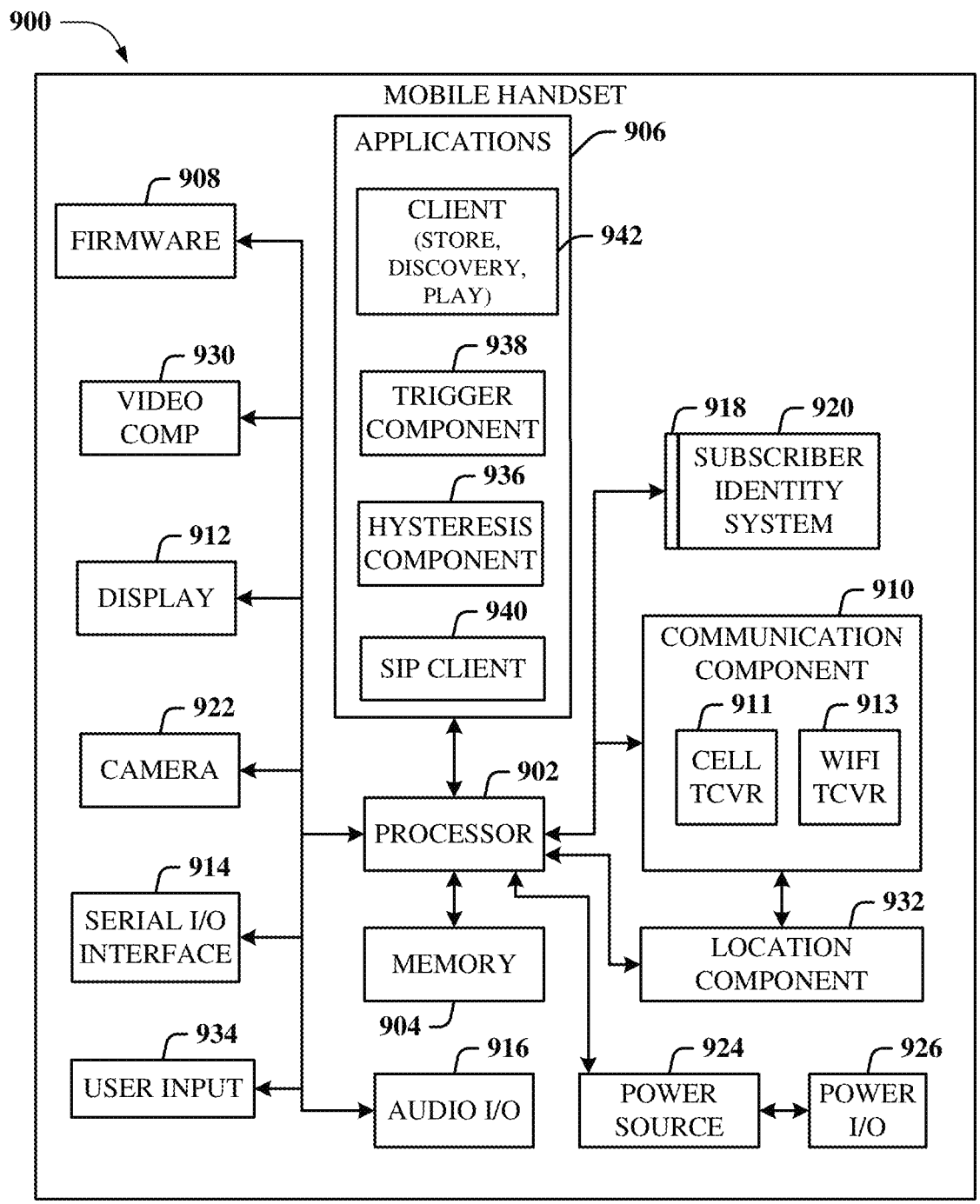
FIG. 9 illustrates an example block diagram of an example mobile handset operable to engage in a system architecture that facilitates wireless communications according to one or more embodiments described herein.

Referring now to FIG. 9, illustrated is an example block diagram of an example mobile handset 900 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This can support updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal.

The user input component 934 can also facilitate the generation, editing and sharing of video quotes. The user input component 934 can include such conventional input device technologies such as a keypad, keyboard, mouse, stylus pen, and/or touchscreen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
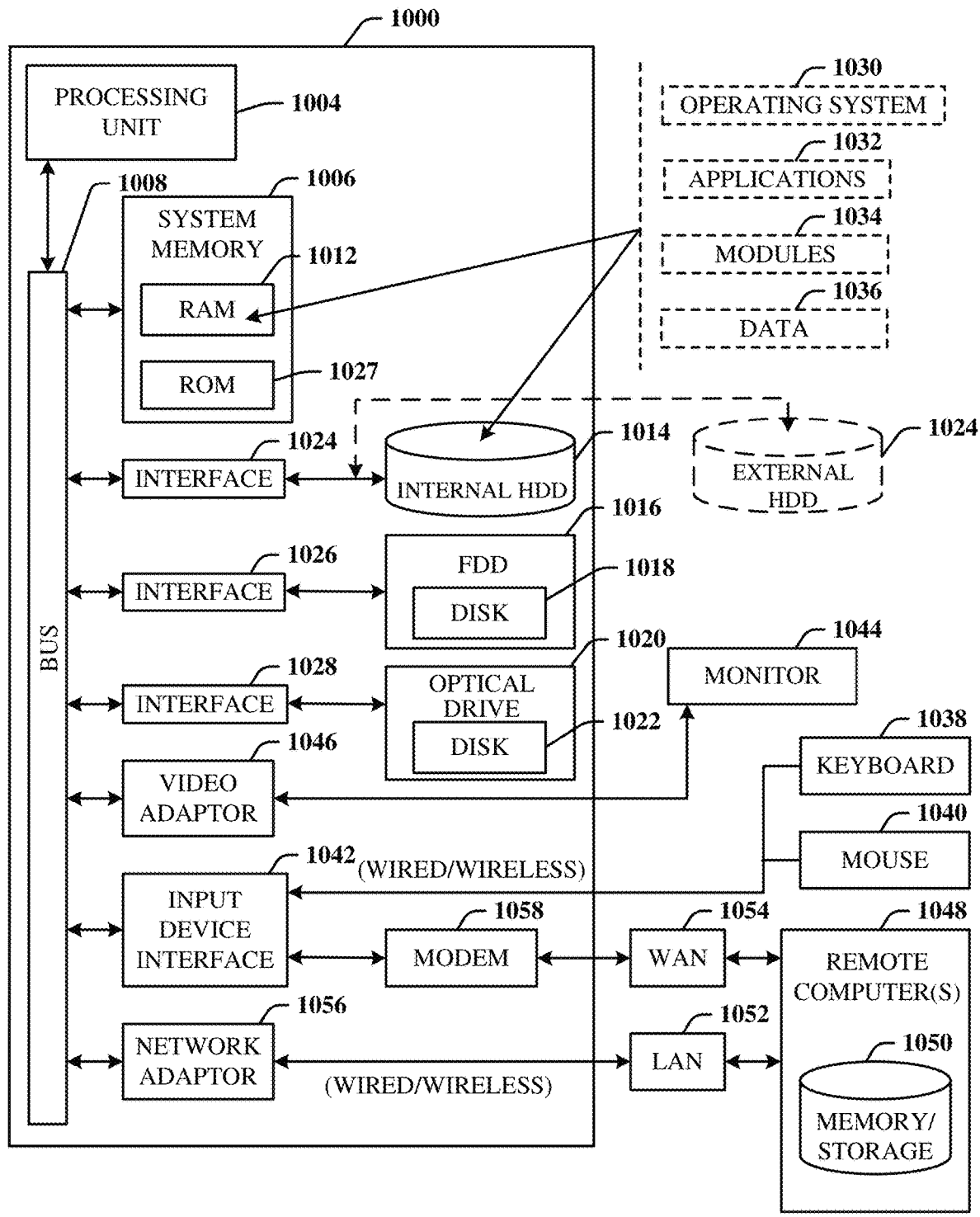
FIG. 10 illustrates an example block diagram of an example computer operable to engage in a system architecture that facilitates wireless communications according to one or more embodiments described herein.

Referring now to FIG. 10, illustrated is an example block diagram of an example computer1000 operable to engage in a system architecture that facilitates wireless communications according to one or more embodiments described herein. The computer1000 can provide networking and communication capabilities between a wired or wireless communication network and a server (e.g., Microsoft server) and/or communication device. In order to provide additional context for various aspects thereof, FIG. 10 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to the end-user device can include a computer1000, the computer1000 including a processing unit1004, a system memory1006 and a system bus1008. The system bus1008 couples system components including, but not limited to, the system memory1006 to the processing unit1004. The processing unit1004 can be any of various commercially available processors. Dual microprocessors and other multi-processor architectures can also be employed as the processing unit1004.

The system bus1008 can be any of several types of bus structure that can further interconnect to a memory bus (with or without a memory controller), a peripheral bus, and a local bus using any of a variety of commercially available bus architectures. The system memory1006 includes read-only memory (ROM)1027 and random access memory (RAM)1012. A basic input/output system (BIOS) is stored in a non-volatile memory1027 such as ROM, EPROM, EEPROM, which BIOS contains the basic routines that help to transfer information between elements within the computer1000, such as during start-up. The RAM1012 can also include a high-speed RAM such as static RAM for caching data.

The computer1000 further includes an internal hard disk drive (HDD)1014 (e.g., EIDE, SATA), which internal hard disk drive1014 can also be configured for external use in a suitable chassis (not shown), a magnetic floppy disk drive (FDD)1016, (e.g., to read from or write to a removable diskette1018) and an optical disk drive1020, (e.g., reading a CD-ROM disk1022 or, to read from or write to other high capacity optical media such as the DVD). The hard disk drive1014, magnetic disk drive1016 and optical disk drive1020 can be connected to the system bus1008 by a hard disk drive interface1024, a magnetic disk drive interface1026 and an optical drive interface1028, respectively. The interface1024 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer1000, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM1012, including an operating system1030, one or more application programs1032, other program modules1034 and program data1036. All or portions of the operating system, applications, modules, and/or data can also be cached in the RAM1012. It is to be appreciated that the innovation can be implemented with various commercially available operating systems or combinations of operating systems.

A user can enter commands and information into the computer1000 through one or more wired/wireless input devices, e.g., a keyboard1038 and a pointing device, such as a mouse1040. Other input devices (not shown) can include a microphone, an IR remote control, a joystick, a game pad, a stylus pen, touchscreen, or the like. These and other input devices are often connected to the processing unit1004 through an input device interface1042 that is coupled to the system bus1008, but can be connected by other interfaces, such as a parallel port, an IEEE 1394 serial port, a game port, a USB port, an IR interface, etc.

A monitor1044 or other type of display device is also connected to the system bus1008 through an interface, such as a video adapter1046. In addition to the monitor1044, a computer1000 typically includes other peripheral output devices (not shown), such as speakers, printers, etc.

The computer1000 can operate in a networked environment using logical connections by wired and/or wireless communications to one or more remote computers, such as a remote computer(s)1048. The remote computer(s)1048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device1050 is illustrated. The logical connections depicted include wired/wireless connectivity to a local area network (LAN)1052 and/or larger networks, e.g., a wide area network (WAN)1054. Such LAN and WAN networking environments are commonplace in offices and companies, and facilitate enterprise-wide computer networks, such as intranets, all of which can connect to a global communications network, e.g., the Internet.

When used in a LAN networking environment, the computer1000 is connected to the local network1052 through a wired and/or wireless communication network interface or adapter1056. The adapter1056 can facilitate wired or wireless communication to the LAN1052, which can also include a wireless access point disposed thereon for communicating with the wireless adapter1056.

When used in a WAN networking environment, the computer1000 can include a modem1058, or is connected to a communications server on the WAN1054, or has other means for establishing communications over the WAN1054, such as by way of the Internet. The modem1058, which can be internal or external and a wired or wireless device, is connected to the system bus1008 through the input device interface1042. In a networked environment, program modules depicted relative to the computer, or portions thereof, can be stored in the remote memory/storage device1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at 7 Mbps (802.11a) or 54 Mbps (802.11b) data rate, for example, or with products that contain both bands (dual band), so the networks can provide real-world performance similar to the basic 16BaseT wired Ethernet networks used in many offices.

An aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

The various aspects described herein can relate to New Radio (NR), which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification procedures and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
a processor; and
a memory that stores executable instructions that, when executed by the processor, facilitate performance of operations, comprising:
evaluating a condition, the condition being at a first mobile device, and a characteristic related to a defined network service associated with a first connection to the first mobile device, and wherein the condition is an emergency situation associated with a location of the first mobile device; and
selectively modifying a first quantity of first antennas utilized to provide the first connection to the first mobile device based on the condition being determined to influence a level of service associated with the defined network service, wherein the selectively modifying comprises:
increasing the first quantity of first antennas utilized to provide the first connection based on a first determination that the first mobile device is an emergency response device; and
decreasing a second quantity of second antennas utilized to provide a second connection to a second mobile device based on a second determination that the second mobile device is a non-emergency response device.

2. The system of claim 1, wherein the decreasing the second quantity of second antennas comprises discontinuing usage of a first antenna of the second quantity of second antennas for the second connection to the second mobile device, and wherein the increasing the first quantity of first antennas comprises adding the first antenna to the first quantity of first antennas.

3. The system of claim 1, wherein the operations further comprise determining the first mobile device is the emergency response device based on credentials of a user identity associated with the first mobile device being determined to be emergency response personnel credentials.

4. The system of claim 1, wherein the decreasing the second quantity of second antennas comprises temporarily halting information transmitted via the second connection to the second mobile device.

5. The system of claim 1, wherein the selectively modifying the first quantity of first antennas comprises transitioning a communication with the first mobile device from an access network to a satellite network.

6. The system of claim 5, wherein the access network is an access network configured to operate according to a fifth generation wireless network communication protocol.

7. The system of claim 5, wherein the satellite network is a satellite network configured to operate according to a sixth generation wireless network communication protocol.

8. A method, comprising:
ascertaining, by a network device of a communications network, a first profile of a first user equipment device and a second profile of a service defined for the first user equipment device, the network device comprising a processor;
determining, by the network device, a change to a condition at a location of the first user equipment device, wherein the condition is an emergency response event; and
adjusting, by the network device, a parameter associated with the first user equipment device, wherein the adjusting comprises compensating for the change to the condition at the location of the first user equipment device, wherein the parameter is a first quantity of first antennas allocated for the first user equipment device, and wherein the adjusting the parameter comprises:
increasing, by the network device, the first quantity of first antennas allocated for the first user equipment device based on a first determination that the first user equipment device is an emergency response device, and
decreasing, by the network device, a second quantity of second antennas allocated for a second user equipment device based on a second determination that the second user equipment device is a non-emergency response device.

9. The method of claim 8, wherein the adjusting the parameter comprises increasing a bandwidth of a communication link provided to the first user equipment device.

10. The method of claim 8, wherein the adjusting the parameter comprises changing a quality of the service during an ongoing communication with the first user equipment device.

11. The method of claim 8, wherein the adjusting the parameter comprises increasing a quantity of antennas utilized to provide a communication to the first user equipment device.

12. The method of claim 8, wherein the adjusting the parameter comprises moving a communication with the first user equipment device from a radio access network of network devices to a satellite network of satellite devices.

13. A non-transitory machine-readable storage medium, comprising executable instructions that, when executed by a processor of a device, facilitate performance of operations, comprising:
evaluating a condition occurring with respect to a first mobile device and a characteristic related to a defined network service associated with a connection to the first mobile device; and
selectively modifying a parameter associated with facilitating the connection to the first mobile device based on a determination that the condition is expected to impact the defined network service, wherein the parameter is a first quantity of first antennas utilized to provide the connection to the first mobile device, and wherein the selectively modifying the parameter comprises:
increasing the first quantity of first antennas utilized to facilitate the connection to the first mobile device based on a first determination that the first mobile device is an emergency response device, and
decreasing a second quantity of second antennas utilized to provide another connection to a second mobile device based on a second determination that the second mobile device is a non-emergency response device.

14. The non-transitory machine-readable storage medium of claim 13, wherein the decreasing the second quantity of second antennas comprises discontinuing usage of a first antenna of the second quantity of second antennas for the other connection to the second mobile device, and wherein the increasing the first quantity of first antennas comprises adding the first antenna to the first quantity of first antennas.

15. The non-transitory machine-readable storage medium of claim 13, wherein the operations further comprise:
determining the first mobile device is the emergency response device based on credentials of a user identity associated with the first mobile device being determined to be emergency response personnel credentials.

16. The non-transitory machine-readable storage medium of claim 13, wherein the decreasing the second quantity of second antennas comprises temporarily halting information transmitted via the other connection to the second mobile device.

17. The non-transitory machine-readable storage medium of claim 13, wherein the selectively modifying the first quantity of first antennas comprises transitioning a communication with the first mobile device from an access network to a satellite network.

18. The method of claim 8, wherein the decreasing the second quantity of second antennas comprises discontinuing usage of a first antenna of the second quantity of second antennas allocated for the second user equipment device, and wherein the increasing the first quantity of first antennas comprises adding the first antenna to the first quantity of first antennas.

19. The method of claim 8, wherein the decreasing the second quantity of second antennas comprises temporarily halting information transmitted via a second connection to the second user equipment device.

20. The method of claim 8, wherein the selectively modifying the first quantity of first antennas comprises transitioning a communication with the first user equipment device from an access network to a satellite network.

* * * * *